United States Patent
Hu

(10) Patent No.: US 8,144,581 B2
(45) Date of Patent: *Mar. 27, 2012

(54) SYSTEM AND METHOD IN AN INTER-CARRIER NETWORK INTERFACE

(75) Inventor: Cheng-Hong Hu, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 71 days.

This patent is subject to a terminal disclaimer.

(21) Appl. No.: 12/559,348

(22) Filed: Sep. 14, 2009

(65) Prior Publication Data

US 2010/0002576 A1 Jan. 7, 2010

Related U.S. Application Data

(63) Continuation of application No. 11/221,083, filed on Sep. 7, 2005, now Pat. No. 7,609,628.

(51) Int. Cl.
*H04L 1/00* (2006.01)
(52) U.S. Cl. .................... 370/230; 370/235
(58) Field of Classification Search .................. 370/216, 370/217, 230, 230.1, 235, 236, 237, 239, 370/254, 392, 400
See application file for complete search history.

(56) References Cited

U.S. PATENT DOCUMENTS

| | | | |
|---|---|---|---|
| 5,687,167 A * | 11/1997 | Bertin et al. | 370/254 |
| 6,744,739 B2 | 6/2004 | Martin | |
| 7,230,949 B2 | 6/2007 | Bharali et al. | |
| 2002/0131362 A1 * | 9/2002 | Callon | 370/216 |
| 2002/0150041 A1 * | 10/2002 | Reinshmidt et al. | 370/216 |
| 2002/0191541 A1 * | 12/2002 | Buchanan et al. | 370/230 |
| 2003/0088698 A1 * | 5/2003 | Singh et al. | 709/239 |
| 2003/0112809 A1 * | 6/2003 | Bharali et al. | 370/400 |
| 2006/0159076 A1 | 7/2006 | Bless et al. | |
| 2006/0159097 A1 * | 7/2006 | Shah et al. | 370/392 |

FOREIGN PATENT DOCUMENTS

WO 2004045133 A1 5/2004

* cited by examiner

*Primary Examiner* — Andrew Lai
(74) *Attorney, Agent, or Firm* — Hanley, Flight, & Zimmerman, LLC

(57) ABSTRACT

A system that incorporates teachings of the present disclosure may include, for example, a PE-ASBR (Provider Edge-Autonomous System Boundary Routers) having a controller to receive new routing information without an attribute of origin, insert a site of origin of the PE-ASBR into the new routing information if the PE-ASBR is dual-homed to another MPLS-VPN cluster, and broadcast to other network elements the new routing information with the site of origin of the PE-ASBR. Additional embodiments are disclosed.

21 Claims, 3 Drawing Sheets

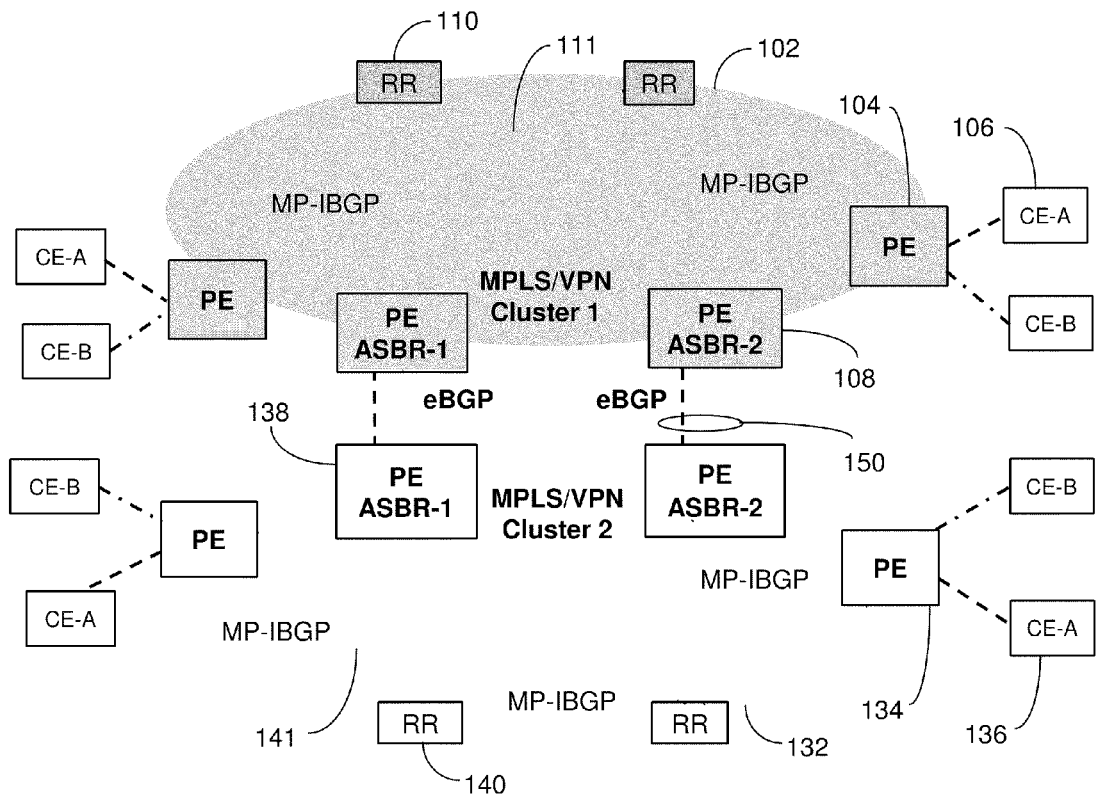
FIG. 1  100
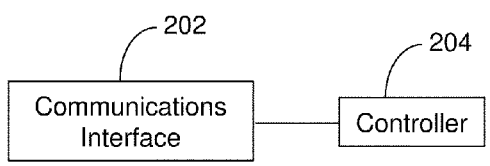
FIG. 2  108, 138

SYSTEM AND METHOD IN AN INTER-CARRIER NETWORK INTERFACE

CROSS-REFERENCE TO RELATED APPLICATIONS

This patent arises from a continuation of U.S. patent application Ser. No. 11/221,083, now U.S. Pat. No 7,609,628, filed Sep. 5, 2005 which is incorporated herein by reference in its entirety.

FIELD OF THE DISCLOSURE

The present disclosure relates generally to inter-carrier networks, and more specifically to a system and method in an inter-carrier network interface.

BACKGROUND

Inter-carrier alliances are common for Multi-protocol Label Switching-Virtual Private Network (MPLS-VPN) service providers. The alliances offer each service provider an extension of geographical coverage of their MPLS-VPN networks, and an opportunity to increase revenue. Inter-carriers have achieved this extension by way of peering conventional PE-ASBRs (Provider Edge-Autonomous System Boundary Routers), which serve to interconnect the MPLS-VPN networks of the service providers.

This method of inter-carrier connectivity has presented service providers a means for offering services to its customers in an expanded geographical footprint with minimal capital investment. Notwithstanding this improvement, when a PE-ASBR of either carrier experiences a fault that interrupts service between the MPLS-VPN networks, customers of each carrier can experience severe service outages until such time that the affected PE-ASBR is returned to service.

BRIEF DESCRIPTION OF THE DRAWINGS

FIG. 1 depicts an illustrative embodiment of an inter-carrier network;

FIG. 2 depicts an illustrative embodiment of a PE-ASBR of FIG. 1;

DETAILED DESCRIPTION OF THE DRAWINGS

Figure 3:
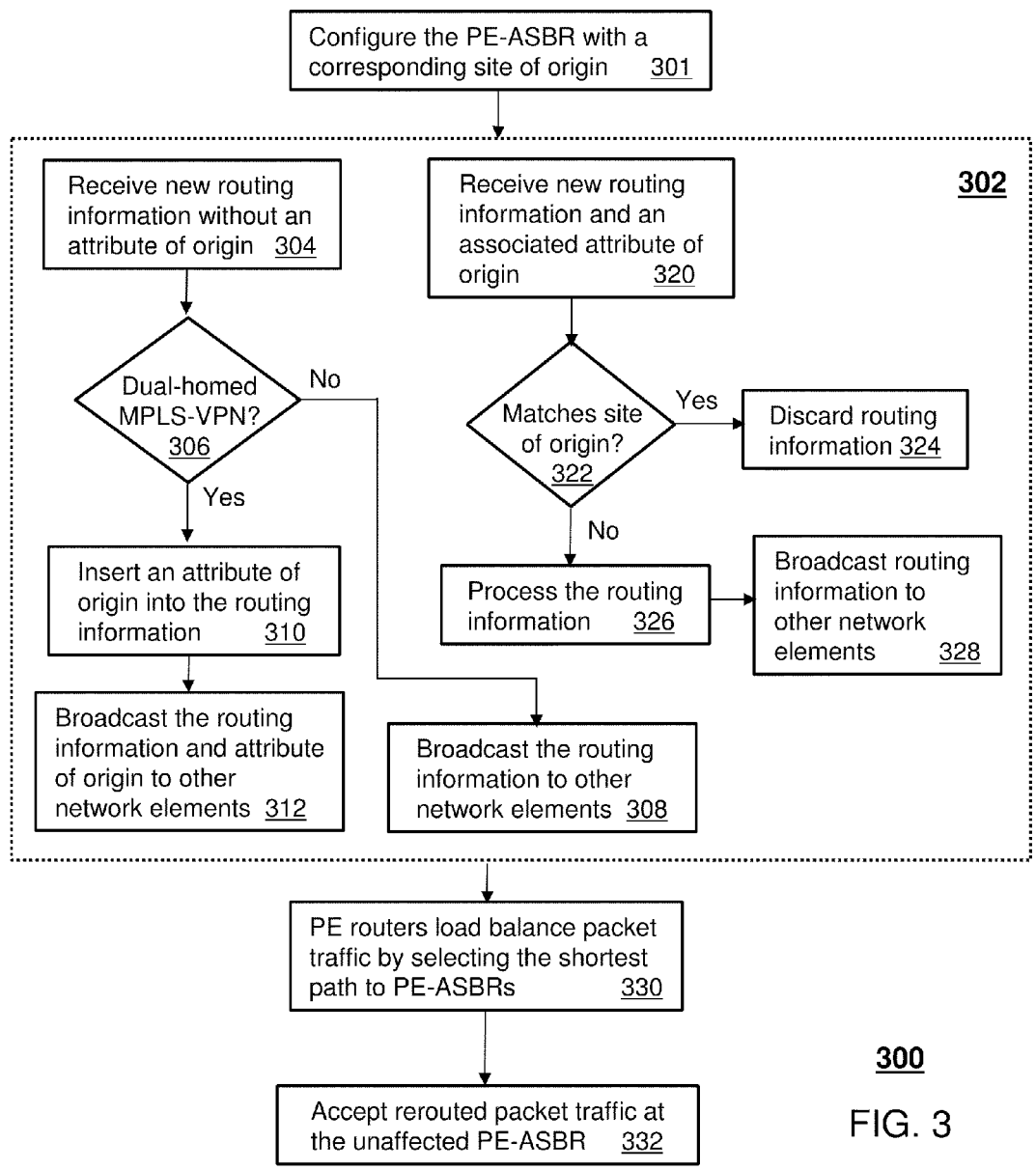
FIG. 3 depicts an illustrative embodiment of a method operating in one or more network elements of FIG. 1.

One embodiment of the present disclosure entails a PE-ASBR (Provider Edge-Autonomous System Boundary Routers) having a controller to receive new routing information without an attribute of origin, insert a site of origin of the PE-ASBR into the new routing information if the PE-ASBR is dual-homed to another MPLS-VPN cluster, and broadcast to other network elements the new routing information with the site of origin of the PE-ASBR.

One embodiment of the present disclosure entails a computer-readable storage medium in a PE-ASBR having computer instructions to receive new routing information without an attribute of origin, and insert a site of origin of the PE-ASBR into the new routing information if the PE-ASBR is dual-homed to another MPLS-VPN cluster.

One embodiment of the present disclosure entails a method to configure each of the PE-ASBRs with a corresponding site of origin. At least one of the PE-ASBRs can be operable to insert a site of origin of the PE-ASBR into the new routing information if the PE-ASBR is dual-homed to another MPLS-VPN cluster, and broadcast to other network elements the new routing information with the site of origin of the PE-ASBR.

One embodiment of the present disclosure entails a method to receive new routing information without an attribute of origin, insert a site of origin of the PE-ASBR into the new routing information if the PE-ASBR is dual-homed to another MPLS-VPN cluster, and broadcast to other network elements the new routing information with the site of origin of the PE-ASBR.

FIG. 1 is block diagram of an inter-carrier network 100 incorporating teachings of the present disclosure. In this illustration, the inter-carrier network 100 comprises two conventional MPLS-VPN clusters 102 and 132 each managed by different service providers. MPLS-VPN cluster 1 (i.e., reference 102) includes two conventional PE (Provider Edge) routers 104 and four conventional CE (Customer Edge) routers 106. Each CE router 106 in turn is coupled to a corresponding customer's VPN network (not shown), and to a corresponding one of the PE routers 104. Additionally, MPLS-VPN cluster 1 includes two PE-ASBRs 108. Each PE-ASBR 108 is coupled to the PE routers 104, and to a corresponding PE-ASBR of MPLS-VPN cluster 2 (i.e., reference 132). MPLS-VPN cluster 1 further includes two conventional route reflectors 110, which serve to reflect routing information to elements of this cluster on links 111.

Like MPLS-VPN cluster 1, MPLS-VPN cluster 2 includes a mirror image of similar elements: PE routers 134, CE routers 136, route reflectors 140 and PE-ASBRs 138. Routing information is reflected on links 141 between the elements of MPLS-VPN cluster 2. Elements of the MPLS-VPN clusters 102 and 132 can intercommunicate according to a Multi-Protocol-Internal Border Gateway Protocol (MP-IBGP). Inter-communications between the PE-ASBRs 108, 138 can conform to an external Border Gateway Protocol (eBGP).

In the illustration of FIG. 1, there are two customers as noted by the designations CE-A and CE-B. Each customer has sites geographically dispersed between MPLS-VPN clusters 1 and 2. Thus, FIG. 1 provides an illustration of an inter-carrier alliance whereby each service provider can serve multiple customers between disparate carrier networks. The packet traffic from these customers (highlighted with unique line designs) is shared by PE-ASBR-1 pairs and PE-ASBR-2 pairs (referenced as 108 and 132) along communication links 150.

FIG. 2 is block diagram of a PE-ASBR 108 or 138 of clusters 1 and 2 according to an embodiment of the present disclosure. The PE-ASBR comprises a communications interface 202 and a controller 204. The communications interface 202 supports conventional MPLS/VPN bidirectional packet traffic. The controller 204 utilizes conventional computing technology such as one or more microprocessors, DSPs (Digital Signal Processors) and corresponding storage media (e.g., RAM, ROM, SRAM, DRAM, FLash, and/or disk drives) for controlling operations of the PE-ASBR in accordance with the present disclosure.

FIG. 3 depicts a flowchart of a method 300 operating in the network elements of the MPLS-VPN clusters 102 and 132, respectively, according to teachings of the present disclosure. Method 300 begins with step 301 where the PE-ASBR is programmed to configure itself with a corresponding site of origin (the other PE-ASBRs of clusters 1 and 2 perform similar configurations). In step 302 the PE-ASBR is further programmed to exchange routing information with a PE-ASBR within its MPLS-VPN cluster and with a corresponding PE-ASBR of another MPLS-VPN cluster when a change is detected. Referring back to FIG. 1, this exchange can occur, for example, between PE-ASBR-2 of cluster 1 exchanging routing information with PE-ASBR-1 of cluster 1, and PE-ASBR-2 of cluster 2.

The routing information exchange can be performed according to the embodiments shown in FIG. 3 for step 302. In these embodiments, two background processes can be used for receiving and updating routing information tables between the PE-ASBRs 108, and 138. In the first process, the PE-ASBR receives in step 304 new routing information without an attribute of origin. The site of origin uniquely identifies a dual-homed CE site (in this case, it is a customer VPN network connected by another provider's MPLS/VPN network with a dual access link.) This attribute has the purpose of avoiding circular updates, as will be discussed shortly. Step 304 can be the result of, for example, a CE-A router 106 of cluster 1 updating its routing tables to reflect changes in the customer VPN network it supports. This update in turn is submitted to the route reflector 110, which submits the update to, for example, PE-ASBR-2 of cluster 1 and other routing elements of said cluster. Continuing with this example, in step 306, if PE-ASBR 2 of cluster 1 is dual-homed to another MPLS-VPN cluster, then the PE-ASBR 2 of cluster 1 proceeds to step 310 where it inserts a site of origin corresponding to the site of origin that the PE-ASBR was configured with in step 301.

Other forms of identifying the origin of the new routing information can be applied to the present disclosure without departing from the scope and spirit of the claims described below. Once step 310 is completed, the PE-ASBR 2 of cluster 1 broadcasts in step 312 the new routing information and its site of origin to other network elements in MPLS-VPN cluster 1 by way of the route reflector 110 and the PE-ASBR 2 of cluster 2. If, on the other hand, PE-ASBR 2 of cluster 1 is not dual-homed, then PE-ASBR 2 of cluster 1 proceeds to step 308 where it broadcasts the routing information to other network elements such as PE-ASBR-2 of cluster 2 on link 150 and PE-ASBR-1 of cluster 1 by way of the route reflector 110 without inserting its site of origin.

At step 320 a PE-ASBR receives new routing information and an associated attribute of origin. The PE-ASBR then determines in step 322 if the attribute of origin received in step 320 matches its configured site of origin. If it does, in step 324 the routing information and site of origin are discarded by the PE-ASBR. Otherwise, the PE-ASBR is programmed to process in step 326 (i.e., update) its routing tables and in step 328 broadcast the routing information to other network elements of its cluster and the other cluster.

Steps 320 through 328 provide a means to prevent a broadcast loop that can be potentially infinite and thereby burden the network elements of clusters 1 and 2. By inserting a site of origin at the receiving PE-ASBR, the originating MPLS-VPN cluster can avoid receiving the new routing information it broadcasted to the other MPLS-VPN cluster. That is, if a PE-ASBR detects that the site of origin matches its MPLS-VPN cluster then it knows that the new routing information has looped back from the other MPLS-VPN cluster and is therefore redundant. By discarding this information, further broadcasting is prevented.

From step 302, the PE routers in step 316 performs load balancing of packet traffic by distributing customer traffic such that the shortest path between the PE routers and the PE-ASBRs is chosen. For example, assume the CE-A routers of clusters 1 and 2 on the right side of FIG. 1 intend to communicate with each other. In this instance, PE router 134 serving CE-A router 136 connects to PE-ASBR-2 of cluster 2 which conveys the customer traffic to PE-ASBR-2 of cluster 1 which in turn couples to PE router 104 serving CE-A router 106.

Load balancing operates best when PE-ASBR-1 and PE-ASBR-2 of both clusters are operational. However, when a PE-ASBR experiences a fault that inhibits packet traffic, the PE-routers associated with the affected PE-ASBR will detect the fault on the basis of the affected PE-ASBR withdrawing its routes from the network so the PE routers can no longer forward traffic to it. Consequently, the PE routers will reroute traffic to the unaffected PE-ASBR of the same MPLS-VPN cluster. If this happens, the unaffected PE-ASBR accepts the rerouted traffic in step 332.

Any technique for mitigating the severity of a fault in a PE-ASBR can be used. For example, where the severity is not severe (e.g., the affected PE-ASBR can still process some traffic but with interruptions), the PE routers can reroute partial traffic between the affected and unaffected PE-ASBRs to mitigate the fault until the affected PE-ASBR is repaired. The foregoing steps thus provide a means for fault-tolerance not available in prior art systems that rely on a single peer-to-peer PE-ASBR.

It would be apparent to an artisan with ordinary skill in the art that the above embodiments can be applied to other network configurations not reflected in FIG. 1. It would also be apparent to said artisan that more complex configurations with more than two PE-ASBRs can be used within the scope of the claims described below.

Figure 4:
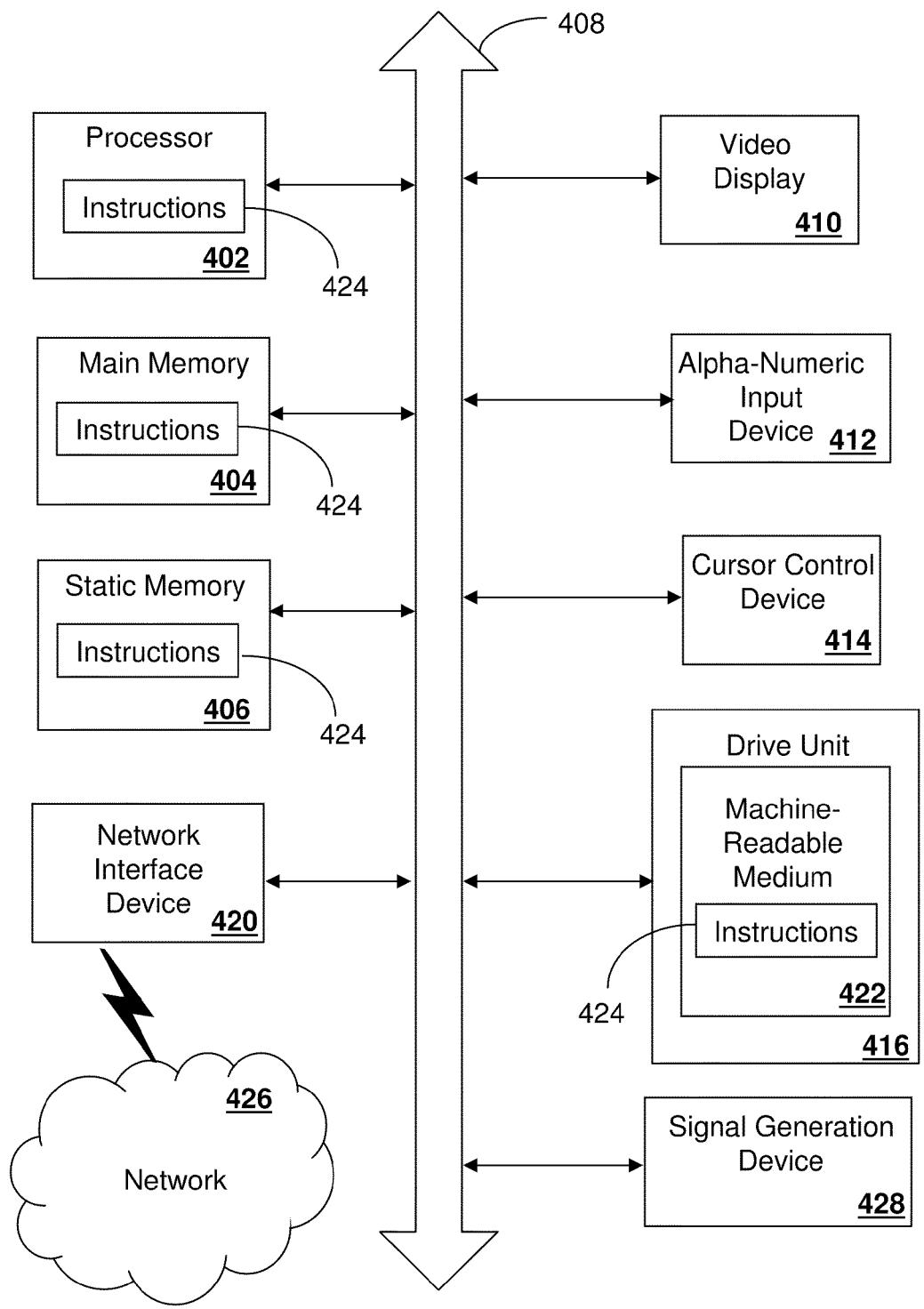
FIG. 4 depicts an illustrative diagrammatic representation of a machine in the form of a computer system within which a set of instructions, when executed, may cause the machine to perform any one or more of the methodologies discussed herein.

FIG. 4 is a diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated in herein above. The instructions 424 may also reside, completely or at least partially, within the main memory 404, the static memory 406, and/or within the processor 402 during execution thereof by the computer system 400. The main memory 404 and the processor 402 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A first PE-ASBR (Provider Edge-Autonomous System Boundary Router), of a first MPLS-VPN cluster comprising:
   a memory; and
   a controller to:
      insert a site of origin of the first PE-ASBR into routing information if the first PE-ASBR is dual-homed to a second MPLS-VPN cluster and if the routing information is received without an attribute of origin; and
      broadcast to a network element other than the first PE-ASBR the routing information with the site of origin of the first PE-ASBR.

2. The first PE-ASBR of claim 1, wherein the controller is to:
configure the first PE-ASBR with the site of origin; and
accept a reroute of packet traffic away from a second PE-ASBR of the first MPLS-VPN cluster, if the second PE-ASBR experiences a fault.

3. The first PE-ASBR of claim 1, wherein the controller is to:
process the routing information if the attribute of origin is received with the routing information and the attribute of origin does not match the site of origin of the first PE-ASBR.

4. The first PE-ASBR of claim 3, wherein the controller is to:
discard the routing information if the attribute of origin matches the site of origin of the first PE-ASBR; and
broadcast the routing information to the network element other than the first PE-ASBR if the attribute of origin does not match the site of origin of the first PE-ASBR.

5. The first PE-ASBR of claim 1, wherein the first MPLS-VPN cluster comprises a plurality of route reflectors, and the controller is to broadcast routing information to a route reflector of the plurality of route reflectors in the first MPLS-VPN cluster, the route reflector to broadcast the routing information to a second PE-ASBR of the first MPLS-VPN cluster.

6. The first PE-ASBR of claim 1, wherein the first MPLS-VPN cluster comprises a PE router to balance packet traffic load by selecting a shortest path to the first PE-ASBR.

7. The first PE-ASBR of claim 1, wherein the first MPLS-VPN cluster comprises a plurality of network elements to communicate in compliance with a Multi-Protocol-Internal Border Gateway Protocol (MP-IBGP).

8. The first PE-ASBR of claim 1, wherein the first PE-ASBR communicates with a second PE-ASBR using an external Border Gateway Protocol (eBGP).

9. A tangible computer-readable storage medium excluding propagating signals and storing computer-readable instructions, which when executed, cause a machine to at least:
receive routing information without an attribute of origin; and
insert a site of origin of a first PE-ASBR of a first MPLS-VPN cluster into the routing information if the first PE-ASBR is dual-homed to a second MPLS-VPN cluster.

10. The storage medium of claim 9, further comprising computer-readable instructions to cause a machine to at least
accept a reroute of packet traffic away from a second PE-ASBR experiencing a fault, and
broadcast to a network element the routing information with the site of origin of the first PE-ASBR.

11. The storage medium of claim 9, further comprising computer-readable instructions to at least:
receive the attribute of origin associated with the routing information;
process the routing information if the attribute of origin does not match the site of origin of the first PE-ASBR; and
discard the routing information if the attribute of origin matches the site of origin of the first PE-ASBR.

12. The storage medium of claim 11, further comprising computer-readable instructions to at least broadcast the routing information to the network element if the attribute of origin received with the routing information does not match the site of origin of the first PE-ASBR.

13. The storage medium of claim 9, wherein a PE router is to balance packet traffic load by selecting a shortest path to the first PE-ASBR.

14. The storage medium of claim 9, wherein network elements of the first MPLS-VPN cluster intercommunicate in compliance with a Multi-Protocol-Internal Border Gateway Protocol (MP-IBGP), and wherein inter PE-ASBR communication conforms to an external Border Gateway Protocol (eBGP).

15. In a first MPLS-VPN cluster comprising a plurality of PE-Routers (Provider Edge Routers), a plurality of route reflectors, and a PE-ASBR (Provider Edge Autonomous System Boundary Router) of the first MPLE-VPN cluster coupled to a PE-ASBR of a second MPLS-VPN cluster, a method comprising:
configuring the PE-ASBR with a corresponding site of origin, the PE-ASBR to:
insert a site of origin of the PE-ASBR into routing information if the PE-ASBR is dual-homed to a second MPLS-VPN cluster; and
broadcast to a network element the routing information with the site of origin of the PE-ASBR.

16. The method of claim 15, further comprising:
detecting a fault in the PE-ASBR;
re-routing packet traffic from the affected PE-ASBR by the fault to an unaffected PE-ASBR; and
accepting the rerouted packet traffic at the unaffected PE-ASBR.

17. The method of claim 15, further comprising:
receiving at the PE-ASBR an attribute of origin associated with the routing information;
processing at the PE-ASBR the routing information if the attribute of origin does not match the site of origin of the PE-ASBR; and
discarding at the PE-ASBR the routing information if the attribute of origin matches the site of origin of the PE-ASBR.

18. The method of claim 17, further comprising broadcasting from the PE-ASBR the routing information to the network element if the attribute of origin does not match the site of origin of the PE-ASBR.

19. The method of claim 15, further comprising balancing packet traffic load from the PE-ASBR by selecting a shortest path to the PE-ASBR.

20. In a PE-ASBR (Provider Edge Autonomous System Boundary Router) of a first MPLS-VPN cluster, a method, comprising:
inserting a site of origin of the PE-ASBR into routing information received without an attribute of origin if the PE-ASBR is dual-homed to a second MPLS-VPN cluster; and
broadcasting to a network element other than the PE-ASBR the routing information with the site of origin of the PE-ASBR.

21. The method of claim 20, further comprising:
processing and broadcasting to the network element other than the PE-ASBR the routing information if the routing information is received with the attribute of origin and if the attribute of origin does not match a site of origin of the first PE-ASBR ; and
discarding the routing information if the attribute of origin matches the site of origin of the PE-Sart.

* * * * *